Feb. 6, 1945.   J. M. SIMPSON   2,368,684
TRANSMISSION CONTROL
Filed Jan. 9, 1942   2 Sheets-Sheet 1

Inventor:
John M. Simpson
By Edward C. Fitzbaugh
Atty

Feb. 6, 1945.   J. M. SIMPSON   2,368,684
TRANSMISSION CONTROL
Filed Jan. 9, 1942   2 Sheets-Sheet 2
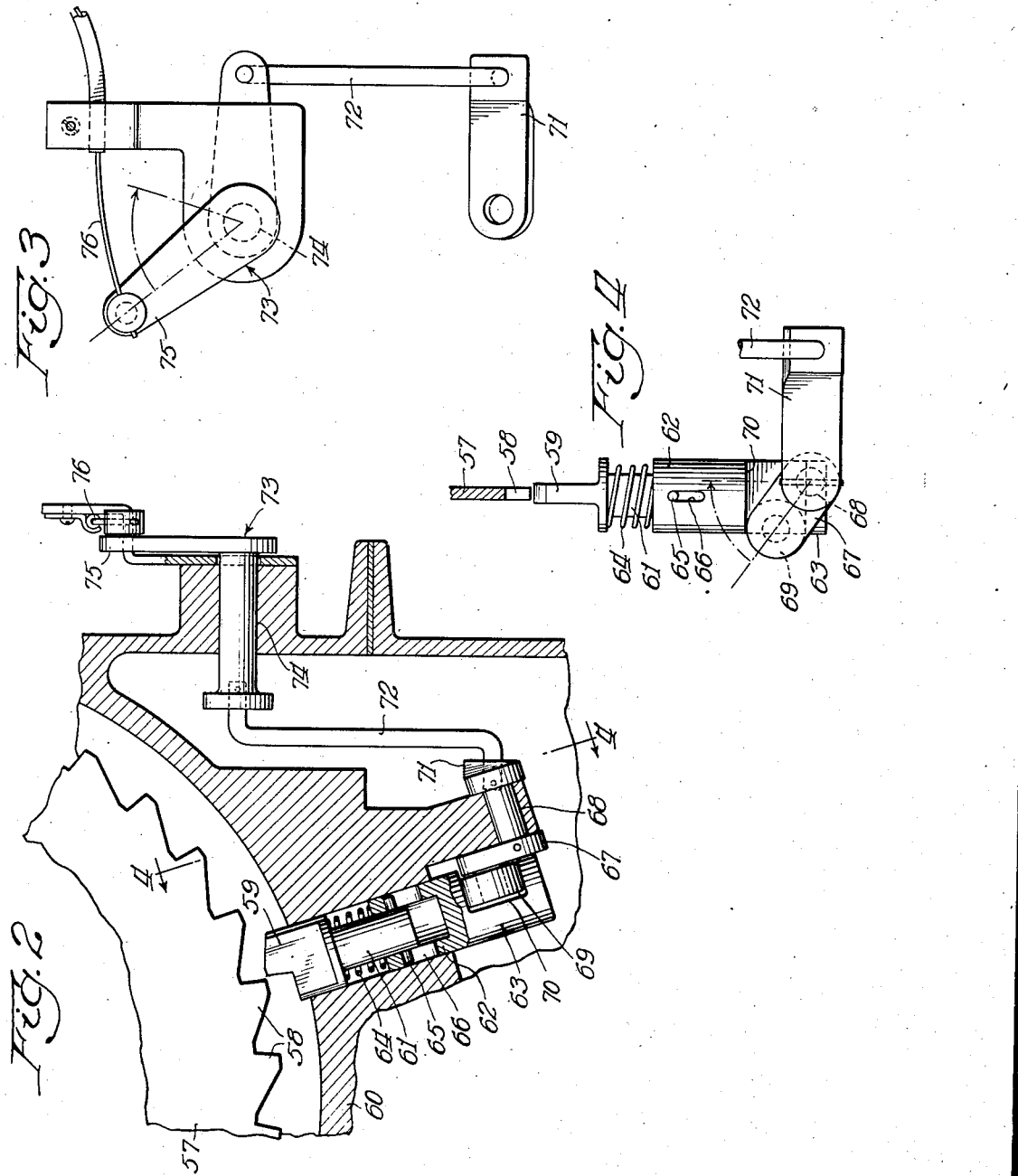
Inventor:
John M. Simpson
By Edward C. Fritzbaugh
Atty.

Patented Feb. 6, 1945

2,368,684

UNITED STATES PATENT OFFICE 2,368,684

TRANSMISSION CONTROL

John M. Simpson, Muncie, Ind., assignor to Borg-Warner Corporation, Chicago, Ill., a corporation of Illinois Application January 9, 1942, Serial No. 426,124

11 Claims. (Cl. 74—189.5)

This invention relates to automatic transmissions, and particularly to a control mechanism therefor.

It has been proposed to combine a hydraulic torque converter with a planetary transmission and with automatically operable controls to effect changes in speed and torque ratio through the transmission. In one such form of transmission the reaction element of the planetary unit is held against rotation by an automatically releasable brake, and the planetary transmission is locked up by a hydraulically operated clutch. The pressure for operating the clutch in the transmission referred to is derived from an engine-driven pump so that when the engine is not rotating no pressure is available for the operation of the clutch. The automatically releasable brake is so arranged that should the driven shaft become the driver, the brake will be released, thereby permitting the reaction element to rotate freely.

It is apparent that with the transmission described above it would be impossible to start the engine by pushing the vehicle, since there would be no means either for locking the transmission in direct drive or for obtaining a reaction point for a reduced drive.

The principal object of this invention is to provide a control means for a transmission of the type referred to which will enable the operator to provide a fixed reaction point for the planetary transmission when it is desired to start the engine by pushing the vehicle.

Another object of this invention is to provide a control means which is manually operable to provide a fixed reaction point for a planetary transmission when the driven shaft becomes a driver, and which automatically releases the reaction point when the engine is started.

Another object of this invention is to provide a manually operable control means to effect a driving connection between the driven shaft and the drive shaft of an automatic transmission, which manually operable control means will not interfere with the operation of the automatic controls for the transmission.

These and other objects and features of this invention will become apparent from the following description when taken together with the accompanying drawings, wherein:

Fig. 2 is an enlarged fragmentary transverse section taken along lines corresponding to 2—2 of Fig. 1;

Fig. 3 is a view showing the linkage for the control; and

Fig. 4 is a detailed view of a portion of the control taken along lines 4—4 of Fig. 2.

Figure 1:
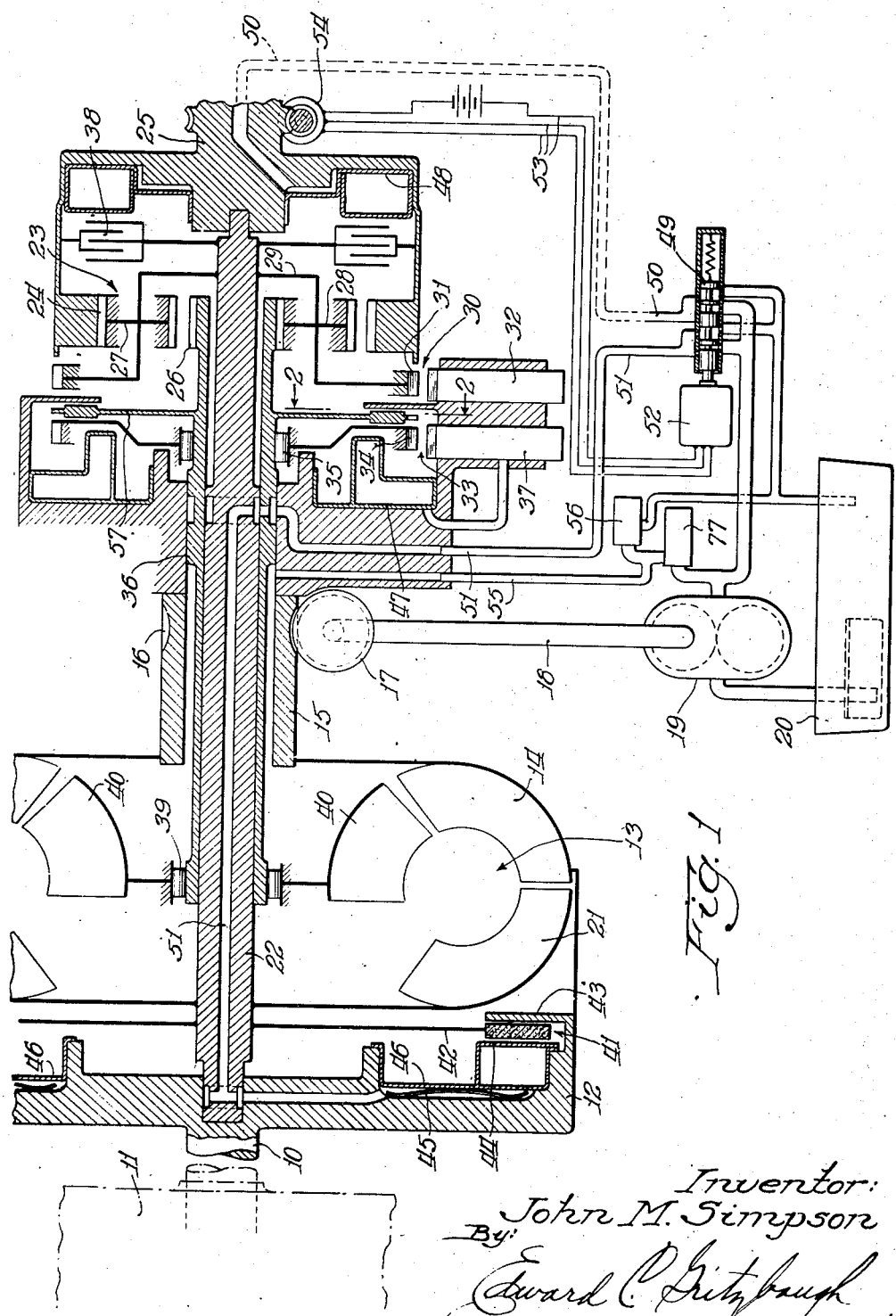
Fig. 1 is a schematic elevation in section of an automatic transmission to which this invention is particularly well adapted.

Referring now to the drawings for a detailed description of the invention, and particularly to Fig. 1, the transmission selected as illustrative of one to which this invention may be applied is comprised of a drive shaft 10 which may be connected to an engine 11 to receive power therefrom, and may in turn be connected to a housing 12 to which it imparts the power received from the engine. Said housing 12 drives a torque converter 13 and is directly connected to the pump element 14 thereof. A sleeve 15 is also adapted to be directly connected to and driven by housing 12, said sleeve 15 being provided at one end with a worm 16 which drives a wheel 17 connected by means of a shaft 18 to a pump 19 located near the sump 20 of the transmission.

Hydraulic torque converter 13 is also provided with the usual turbine element 21 directly connected to a shaft 22 which extends to the right (Fig. 1) to connect with and drive a planetary transmission 23. Said planetary transmission 23 is comprised of a ring gear 24 directly connected to a driven shaft 25, a sun gear 26 mounted on and freely rotatable with respect to shaft 22, and planet pinions 27 and 28, said planet pinions being so arranged that pinion 27 is in mesh with ring gear 24 and with planet pinion 28, which in turn is in mesh with sun gear 26. The planet pinions 27 and 28 are mounted on a carrier 29 which is secured to shaft 22 and rotates therewith. Planet pinions 27 and 28 act as reversing pinions between sun gear 26 and ring gear 24 when carrier 29 is held against rotation. Thus the drive of sun gear 26 will be in the same direction as ring gear 24 instead of in the opposite direction as is usually the case when the carrier of a conventional single-pinion planetary is held against rotation.

Carrier 29 and its associated shaft 22 and turbine element 21 are adapted to be held against rotation by means of a brake 30 of the positive type having a toothed ratchet wheel 31 secured to the carrier 29, and a radially slidable pawl 32 adapted to be moved into engagement with ratchet wheel 31 to arrest the rotation thereof. Sun gear 26 may be held against rotation by means of a second brake 33 of the positive type having a toothed ratchet wheel 34 connected through a roller-and-cam type automatically releasable brake 35 to a sleeve 36 to which sun gear 26 is rigidly secured. A pawl 37 is adapted to be moved radially inwardly to engage ratchet wheel 34 to arrest the rotation of gear 26. Both automatically releasable brake 35 and positive brake 33 are so arranged that sleeve 36 will be held against reverse rotation with respect to drive shaft 10, but will be permitted to rotate in a forward direction with respect to said drive shaft.

An auxiliary brake means is provided for ratchet wheel 34 in the form of a piston 47 which is fixed against rotation and is movable axially into engagement with the side of wheel 34.

Ring gear 24 may be directly connected to shaft 22 by means of a friction clutch 38 controlled by a piston 48. Since carrier 29 is likewise connected to shaft 22, the engagement of clutch 38, in effect, couples carrier 29 to ring gear 24 and thereby establishes a locked up condition in the planetary transmission.

The left-hand end (Fig. 1) of sleeve 36 is connected by means of a roller-and-cam type one-way brake 39 to the stator or reaction element 40 of hydraulic torque converter 13. Brake 39 is likewise arranged to prevent a reverse rotation of stator 40 with respect to sleeve 36, but permits said stator 40 to rotate ahead of sleeve 36 in a forward direction.

An auxiliary connection between shaft 22 and housing 12 is provided in the form of a friction clutch 41 located ahead of hydraulic torque converter 13. Said clutch 41 is comprised of a friction disc 42 secured to and rotatable with shaft 22, and a pair of pressure members 43 and 44 rotatable with housing 12. Clutch 41 is normally maintained in engaged position by means of a series of springs 45 which are compressed between housing 12 and a piston 46 which controls the movement of pressure member 44.

Thus, brake 33 and clutch 38 are controlled by fluid pressure operated devices; brake 33 being controlled by piston 47, and clutch 38 by piston 48. The fluid pressure for operating these devices is derived from pump 19 which, it will be observed, is driven only when engine 11 is rotating. With engine 11 rotating so that pump 19 is effective, oil or other fluid is drawn from sump 20 and is pumped under pressure to a selector valve 49 which controls the distribution of fluid under pressure in conduits 50 and 51 leading to pistons 48 and 46, respectively. Said selector valve 49 is controlled by a solenoid 52 which in turn is connected by means of suitable wires 53 to a governor 54 driven from driven shaft 25. The pressure of the fluid passing through selector valve 49 is regulated by a pressure limiting valve 77, the exhaust port of which is connected by means of a conduit 55 to housing 12 so as to keep the latter filled with fluid under pressure. The pressure in housing 12 is regulated by a second pressure limiting valve 56.

The operation of the transmission is as follows:

For low speed drive, brake 33 is engaged and the torque from engine 11 is transmitted through hydraulic torque converter 13 to shaft 22, carrier 29, planet pinions 27 and 28, and ring gear 24 to driven shaft 25. To prevent undue clash during the engagement of positive brake 33, ratchet wheel 34 is momentarily arrested by means of piston 47, the operation of which is controlled by a valve (not shown) in pawl 37 connected to a suitable source of fluid under pressure. During low speed drive, clutch 41 is disengaged by reason of the pressure within housing 12 exceeding the engaging pressure of springs 45. At some appropriate speed, governor 54 will actuate solenoid 52 and its associated selector valve 49 to admit fluid pressure behind piston 48 to operate clutch 38. This locks up the planetary transmission 23 and establishes a direct drive between shaft 22 and driven shaft 25. To establish direct drive it is unnecessary to release brake 33, since the release is effected automatically by releasable brake 35. At some higher speed, governor 54 will again actuate solenoid 52 to move selector valve 49 to a position in which oil is admitted behind piston 46, thereby operating clutch 41 to establish a direct drive between drive shaft 10 and shaft 22 and by-pass torque converter 13. For reverse drive, carrier 29 is held by means of positive brake 30 and all other clutches and brakes are released. This reverses the functions of turbine element 21 and stator 40 so that the turbine is held and the stator is permitted to rotate in a reverse direction. This reverse rotation is transmitted through planet pinions 27 and 28 to ring gear 24 and thence to driven shaft 25.

It is obvious that in the transmission just described a drive from driven shaft 25 to drive shaft 10 is impossible when fluid pressure is not available to operate clutch 38, since all other connections between the two shafts are effectively broken. This means that it would be impossible to start engine 11 by pushing the vehicle unless some substitute connection were provided for those normally used in forward drive. This substitute connection will now be described.

In the transmission shown all that is necessary to establish a driving connection between driven shaft 25 and drive shaft 10 is to provide a reaction point for sun gear 26 of planetary transmission 23. This reaction element is supplied in the form of a disc 57 which is mounted on sleeve 36 and drivingly associated therewith. Means hereinafter to be described, are provided for arresting the rotation of disc 57 when it is desired to start engine 11 by pushing the vehicle.

Referring now to Figs. 2, 3 and 4 for a detailed description of the holding means, it will be observed from Fig. 2 that disc 57 is provided with teeth 58 which are adapted to be engaged by a radially slidable pawl 59 located in housing 60 of the transmission. Teeth 58 are so shaped as to be held by pawl 59 when disc 57 tends to turn in a forward direction, that is, in the same direction as drive shaft 10, and to tend to eject pawl 59 when the direction of rotation is opposite to that of drive shaft 10.

Pawl 59 is provided with a stem 61 which fits into the end 62 of a pawl operator 63. A compression spring 64 normally urges pawl 59 radially inward away from the end of operator 63. The movement of pawl 59 is limited, however, by means of a pin 65 passing through stem 61 and riding with a slot 66 in operator 63. Thus, the radial inward movement of operator 63 merely compresses spring 64 without necessarily moving pawl 59, the latter being ejected by teeth 58 if disc 57 is rotating in a clockwise direction as viewed in Fig. 2, and being snapped into engagement when the direction of rotation of disc 57 is in the opposite direction.

Operator 63 is controlled by a crank 67 rotatably supported in housing 60 at 68 and provided with a roller 69 riding in a slot 70 in operator 63. The outer end 71 of crank 67 is connected by means of a link 72 to a second crank 73 rotatably supported in housing 60 at 74. The opposite end 75 of crank 73 is connected to a Bowden wire 76 which passes up to the driver's compartment and may be pulled or pushed by the driver to rotate crank 73.

The operation of the manually controlled mechanism just described is as follows:

Assuming that the engine is not rotating and that it is desired to start the engine by pushing the vehicle, the operator pulls Bowden wire 76 to the right (Fig. 3) which rotates crank 73 through a small arc, and the rotary movement is transmitted by means of connecting link 72 to arm 71 of crank 67. The resulting rotation of crank 67 causes operator 63 to be moved radially inwardly. This inward movement of operator 63 is transmitted to spring 64 and pawl 59. If teeth 58 of disc 57 are in the position shown in Fig. 2 with respect to pawl 59, the latter will move into engaging position immediately. This prevents disc 57 and its associated shaft 36 and sun gear 26 from rotating in a forward direction. An inspection of planetary gear set 23 will show that when sun gear 26 is prevented from rotating in a forward direction and ring gear 24 is driven in a forward direction by shaft 25, as is the case when the vehicle is pushed, carrier 29 will be rotated in a forward direction at an overdrive with respect to shaft 25. This is necessarily so since the reaction of the load on carrier 29 will tend to rotate sun gear 26 in a forward direction, and with sun gear 26 held against such forward rotation, shaft 22 must then rotate. Under these conditions, although there is no fluid pressure available in the hydraulic system, clutch 41 will nevertheless be engaged because of the action of springs 45 against piston 46, and a direct connection will be established between shaft 22 and drive shaft 10. The rotation of ring gear 24 in a forward direction, therefore, results in rotation of shaft 10 in the same direction at an overdrive speed, thereby turning over the engine to start the latter. Just as soon as the engine commences to rotate under its own power, the reaction on sun gear 26 reverses direction so as to tend to rotate the latter reversely. Assuming that brake 33 had been released to permit the engine to warm up, the subsequent rotation of the engine will cause disc 57 to rotate in the same direction as the engine, which, as described, causes pawl 59 to be ejected from teeth 58. The ratcheting of pawl 59 over teeth 58 makes an audible sound which constitutes a signal to the driver to withdraw operator 63.

Although the push start control mechanism disclosed herein is particularly well adapted for use with a transmission of the type described, it can nevertheless be adapted for use with other planetary transmissions, and it is understood therefore that the scope of this invention is not to be limited to the foregoing disclosure, but is to be determined by the appended claims.

I claim:

1. A transmission comprising a drive shaft, a driven shaft, an intermediate shaft, gearing including a reaction element for effecting a connection between the intermediate shaft and driven shaft, means for effecting a direct connection between the intermediate and driven shafts, hydraulic means dependent upon fluid pressure for effecting a connection between the drive and intermediate shafts, mechanical means for effecting a direct connection between the drive and intermediate shafts, said mechanical means being normally released by the pressure in the hydraulic means, hydraulically operated means for operating the direct connection between the intermediate and driven shafts, means for establishing a reaction point for the gearing, said last mentioned means being automatically releasable when the driven shaft becomes the driver, means dependent upon rotation of the drive shaft for establishing the hydraulic pressure required to render said connections effective, means for establishing a reaction point for said gearing when the driven shaft becomes the driver and said driving shaft is not rotating, said last mentioned means comprising means normally effecting said mechanical connection when there is no hydraulic pressure, and manually operated brake means for preventing the release of the reaction point when the driven shaft becomes the driver.

2. A transmission as described in claim 1, said mechanical means for effecting a connection between the intermediate and drive shafts comprising a friction clutch, an operator for the clutch comprising a piston rotatable with the drive shaft and adapted to exert pressure upon the friction clutch to effect engagement thereof, and means for effecting engagement of the clutch, said means comprising resilient means normally biasing the piston to engaged position.

3. In an automotive vehicle, the combination of an engine, a drive shaft, a driven shaft, means connecting said drive shaft and said engine whereby the drive shaft may drive the engine in a forward direction from a state of rest and the engine may drive the drive shaft, change speed gearing adapted to provide a plurality of connections between said shafts to establish a forward drive therebetween, each of said connections being dependent upon rotation of the drive shaft, and manually operated means effective when applied for establishing a connection from the driven shaft to the drive shaft when the drive shaft is not rotating whereby said driven shaft may be driven in a forward direction to drive said engine in such direction from a state of rest to start the engine, said last-mentioned means while applied being arranged to automatically release to be ineffective for driving said driven shaft when the drive shaft is being driven by said engine.

4. In an automotive vehicle, the combination of an engine, a drive shaft, a driven shaft, means connecting said drive shaft and said engine whereby the drive shaft may drive the engine in a forward direction from a state of rest and the engine may drive the drive shaft, change speed gearing connectible between said shafts to establish a plurality of forward driving connections between the shafts, each of said connections being dependent upon rotation of the drive shaft, and means for establishing a driving connection between the driven shaft and the drive shaft when the drive shaft is not rotating whereby said driven shaft may be driven in a forward direction to drive said engine in such direction from a state of rest to start the engine and comprising a ratchet wheel adapted to provide a reaction point for one of said connections, and a manually operable pawl adapted to engage said ratchet wheel to establish the reaction point.

5. In an automotive vehicle, the combination as described in claim 4, and means for automatically releasing the pawl when a forward driving connection is established from the drive shaft to the driven shaft.

6. In an automotive vehicle, the combination of an engine, a drive shaft, a driven shaft, means connecting said drive shaft and said engine whereby the drive shaft may drive the engine in a forward direction from a state of rest and the engine may drive the drive shaft, change speed gearing connectible between the shafts to establish a plurality of forward driving connections therebetween, each of said connections being dependent upon rotation of the drive shaft, and means including a reaction element for establishing a driving connection between the driven shaft and the drive shaft when the drive shaft is not rotating whereby said driven shaft may be driven in a forward direction to drive said engine in such direction from a state of rest to start the engine, said last named means comprising a ratchet wheel, a pawl movable into engagement with the ratchet wheel to prevent rotation of the wheel in one direction, a manually movable operator for the pawl, and resilient means between the operator and the pawl whereby the pawl may be released upon rotation of the wheel in an opposite direction without moving the operator to an inoperative position.

7. In an automotive vehicle, the combination as described in claim 6, said operator being non-rotatable, and said pawl having a pin and slot connection with the operator whereby said pawl may be withdrawn from contact with the wheel and also is prevented from rotating with respect to the wheel.

8. In an automotive vehicle, the combination as described in claim 6, said operator having a transverse slot, and a manually operated lever, said lever having a roller cooperating with the transverse slot to effect a reciprocating movement in the operator.

9. In an automotive vehicle, the combination of an engine, a drive shaft, a driven shaft, means connecting said drive shaft and said engine whereby the drive shaft may drive the engine in a forward direction from a state of rest and the engine may drive the drive shaft, change speed gearing connectible between said shafts to establish a forward drive therebetween, a reaction element for said gearing, said gearing being so arranged that when the drive shaft is the driver the reaction will be in a reverse direction and when the driven shaft is the driver the reaction will be in a forward direction, means for automatically releasing the reaction element when the reaction is in a forward direction, and manually operable means for holding the reaction element when said element is automatically released whereby said driven shaft may be driven in a forward direction to drive said engine in such direction from a state of rest to start the engine, said manually operable means being arranged to automatically release said reaction element when said drive shaft becomes the driver.

10. In an automotive vehicle, the combination of an engine, a drive shaft adapted to be driven by said engine, a driven shaft, change speed gearing connectible between said shafts to establish a forward drive therebetween, means for establishing a power train from said driven shaft to said engine for driving the engine in a forward direction from a state of rest to start the engine, said last-named means including a reaction element arranged when held against rotation to complete said power train, and a one-way brake for holding said reaction element against rotation to complete said power train and adapted to release when said engine drives said drive shaft.

11. In an automotive vehicle, the combination of an engine, a drive shaft, a driven shaft, means connecting said drive shaft and said engine whereby the drive shaft may drive the engine in a forward direction from a state of rest and the engine may drive the drive shaft, change speed gearing connectible between said shafts to establish a plurality of forward driving connections therebetween, each of said connections being dependent upon rotation of said drive shaft, means for establishing a power train from said driven shaft to said engine for driving the engine in a forward direction from a state of rest to start the engine, said last-named means including a reaction element arranged when held against rotation to complete said power train, a one-way brake for holding said reaction element against rotation in one direction so as to complete said power train and adapted to release when said engine drives said drive shaft, and means for selectively rendering said one-way brake effective or ineffective.

JOHN M. SIMPSON.